(12) United States Patent
Motoshima et al.

(10) Patent No.: US 10,679,109 B2
(45) Date of Patent: Jun. 9, 2020

(54) TAG COMMUNICATION DEVICE, CONTROL METHOD THEREOF, AND CONTROL PROGRAM

(71) Applicant: OMRON Corporation, Kyoto (JP)

(72) Inventors: Hiroaki Motoshima, Kyoto (JP); Tatsuo Yoshida, Kyoto (JP); Shuichi Matsui, Kyoto (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 16/352,853

(22) Filed: Mar. 14, 2019

(65) Prior Publication Data
US 2019/0325281 A1     Oct. 24, 2019

(30) Foreign Application Priority Data

Apr. 23, 2018 (JP) ................. 2018-082278

(51) Int. Cl.
| | |
|---|---|
| *G06K 19/07* | (2006.01) |
| *G06K 7/00* | (2006.01) |
| *G06K 7/10* | (2006.01) |
| *H04Q 9/00* | (2006.01) |

(52) U.S. Cl.
CPC ....... *G06K 19/0723* (2013.01); *G06K 7/0008* (2013.01); *G06K 7/10415* (2013.01); *H04Q 9/00* (2013.01); *H04Q 2209/47* (2013.01)

(58) Field of Classification Search
CPC .......... G06K 19/0723; G06K 7/10415; G06K 7/0008; G06K 7/10079; G06K 7/10128; H04Q 9/00; H04Q 2209/47
See application file for complete search history.

(56) References Cited

U.S. PATENT DOCUMENTS

2005/0116813 A1    6/2005   Raskar

FOREIGN PATENT DOCUMENTS

| | | |
|---|---|---|
| EP | 1795915 | 6/2007 |
| JP | 2006010345 | 1/2006 |
| JP | 2011067077 | 3/2011 |

OTHER PUBLICATIONS

"Search Report of Europe Counterpart Application", dated Sep. 12, 2019, p. 1-p. 7.

*Primary Examiner* — Ryan W Sherwin
(74) *Attorney, Agent, or Firm* — JCIPRNET

(57) ABSTRACT

A tag communication device performing radio communication with an RFID tag includes a light emitting unit. The tag communication device includes a communication unit, an imaging unit, and a control unit. The control unit (i) acquires a tag ID of RFID tags present in the communicable range of the communication unit, (ii) transmits a light emission instruction to some of RFID tags corresponding to the acquired tag ID, (iii) determines presence/absence of light emission of the light emitting unit based on the light emission instruction within an imaging area of the imaging unit on the basis of a result of imaging acquired by the imaging unit, and (iv) performs a predetermined operation for an RFID tag to which the light emission instruction has been transmitted in a case in which it is determined that light emission of the light emitting unit based on the light emission instruction is present.

19 Claims, 11 Drawing Sheets

| Digit | Light emission pattern |
|---|---|
| 0000 | Blue |
| 0001 | Red |
| ⋮ | ⋮ |

FIG. 9A

| Light emission pattern | Operation |
|---|---|
| Blue | Write data A |
| Red | Write data B |
| White | No operation |
| ⋮ | ⋮ |

FIG. 9B

TAG COMMUNICATION DEVICE, CONTROL METHOD THEREOF, AND CONTROL PROGRAM

CROSS-REFERENCE TO RELATED APPLICATION

This application claims the priority of Japan patent application serial no. 2018-082278, filed on Apr. 23, 2018. The entirety of the above-mentioned patent application is hereby incorporated by reference herein and made a part of this specification.

BACKGROUND

Technical Field

The disclosure relates to a tag communication device performing radio communication with an RFID tag including a light emitting unit, a control method thereof, and a control program.

Description of Related Art

Radio frequency identification (RFID) technologies are technologies for reading information of an RFID tag or writing information in an RFID tag by performing radio communication with the RFID tag and are used in various industrial fields. As one example thereof, there is an application for articles on production lines. In other words, an RFID tag is attached to each article on a production line, and the progress of various production processes is monitored and managed on the basis of information stored in the RFID tag.

In such an application example, in order to perform an operation for an RFID tag present at a specific position, a technology for identifying the position of an RFID tag communicating with a tag communication device becomes significant. Regarding this point, Patent Document 1 (Japanese Patent Application Laid-Open No. 2006-010345 (Published on Jan. 12, 2006)) discloses a tag communication device capable of identifying the position of each RFID tag by employing a simple configuration.

However, in the conventional technology such as that described above, there is a likelihood of the identification of the position of an RFID tag becoming inaccurate due to the influence of multiple paths generated in accordance with reflection of radio waves. As a result, there is concern of an operation being performed for an RFID tag that is not present at a specific position.

SUMMARY

The disclosure is to provide a tag communication device capable of performing an operation for an RFID tag present at a specific position more accurately.

A tag communication device according to one embodiment of the disclosure is a tag communication device performing radio communication with an RFID tag including a light emitting unit, the tag communication device including: a communication unit that performs radio communication with the RFID tag; an imaging unit that images at least a part of a communicable range of the communication unit; and a control unit, and the control unit performs: (i) an acquisition process of acquiring a tag identification (ID) of one or more RFID tags present in the communicable range of the communication unit through the communication unit; (ii) a transmission process of transmitting a light emission instruction to at least some of RFID tags corresponding to the acquired tag ID through the communication unit; (iii) a determination process of determining presence/absence of light emission of the light emitting unit based on the light emission instruction within an imaging area of the imaging unit on the basis of a result of imaging acquired by the imaging unit; and (iv) an operation process of performing a predetermined operation for an RFID tag to which the light emission instruction has been transmitted through the communication unit in a case in which it is determined that light emission of the light emitting unit based on the light emission instruction is present.

A method of controlling a tag communication device according to one embodiment of the disclosure is a method of controlling a tag communication device that includes a communication unit and an imaging unit and performs radio communication with the RFID tag including a light emitting unit, wherein the communication unit performs radio communication with the RFID tag, and the imaging unit images at least a part of a communicable range of the communication unit, the method including: (i) an acquisition step of acquiring a tag identification (ID) of one or more RFID tags present in the communicable range of the communication unit through the communication unit; (ii) a transmission step of transmitting a light emission instruction to at least some of RFID tags corresponding to the acquired tag ID through the communication unit; (iii) a determination step of determining presence/absence of light emission of the light emitting unit based on the light emission instruction within an imaging area of the imaging unit on the basis of a result of imaging acquired by the imaging unit; and (iv) an operation step of performing a predetermined operation for an RFID tag to which the light emission instruction has been transmitted through the communication unit in a case in which it is determined that light emission of the light emitting unit based on the light emission instruction is present.

BRIEF DESCRIPTION OF THE DRAWINGS

FIG. 9A illustrates one example of the data configuration of data referred to by an RFID tag in the modified examples (4-4-1 and 4-4-2) of the disclosure, and FIG. 9B is one example of the data configuration of data referred to by a tag communication device in the modified examples (4-4-1 and 4-4-2) of the disclosure.

DESCRIPTION OF THE EMBODIMENTS

Figure 1:
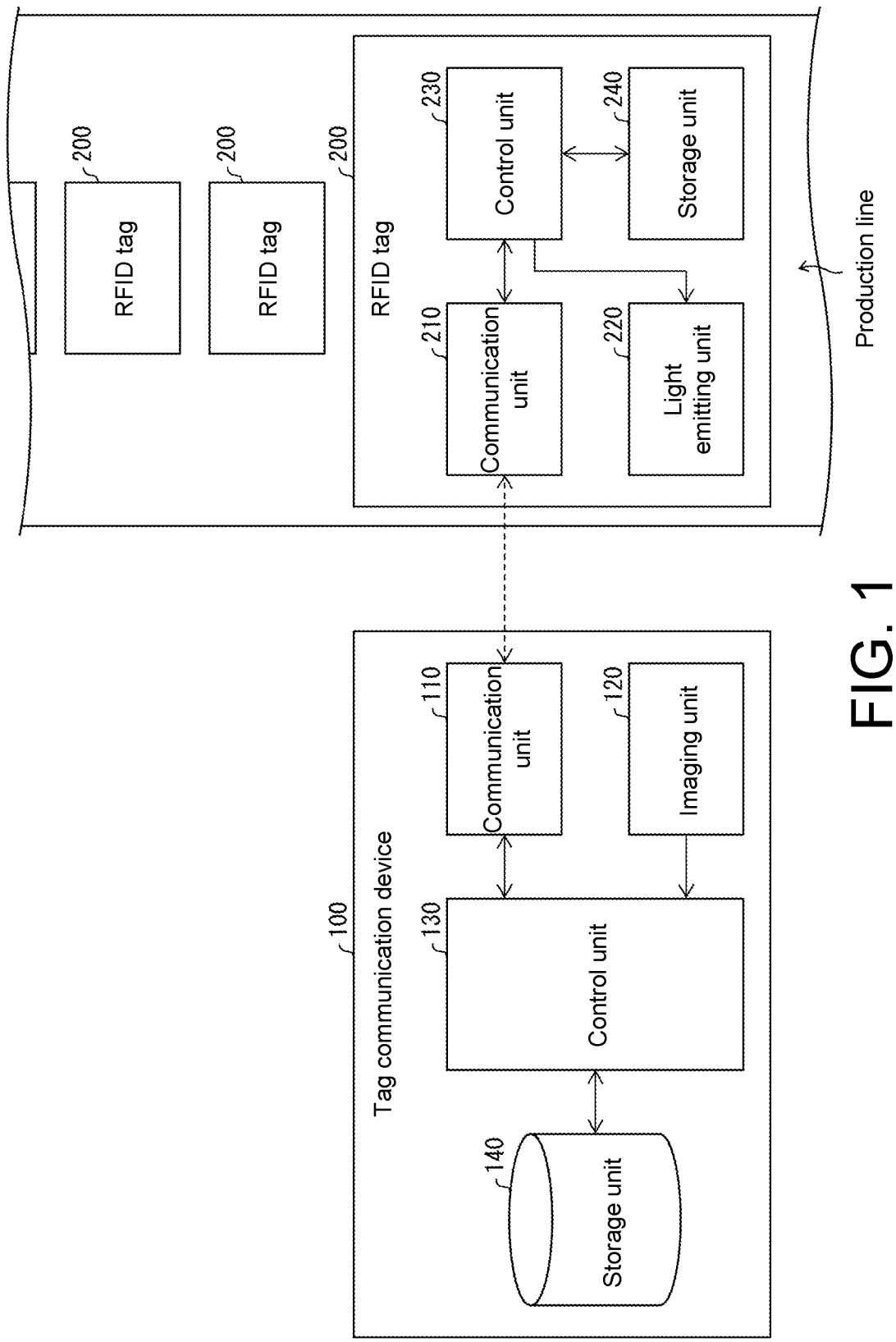
FIG. 1 is an exemplary overview diagram of a tag communication system according to an embodiment of the disclosure.

According to the configuration described above, the tag communication device described above transmits a light emission instruction to the RFID tag and performs a predetermined operation for the RFID tag in a case in which light emission of the RFID tag based on the light emission instruction is detected. In other words, when the position of the RFID is to be identified, the tag communication device described above also uses information relating to a position acquired by the imaging unit in addition to a radio wave signal generated by the RFID tag. As a result, the tag communication device can perform an operation for the RFID present at a specific position more accurately.

"Radio frequency identification (RFID) tag" as used in this specification generally refers to an information medium for which information stored in an internal memory is read and written using radio waves in a non-contact manner. A tag communication device (reader/writer) is used for reading and writing information of the RFID tag. The RFID tag may be referred to as an "RF tag," an "electronic tag," an "IC tag," a "radio tag" or the like. In addition, RFID tags described in this specification include both passive tags and active tags and also include non-contacting IC cards mainly held by people.

In one embodiment, in a case in which light emission instructions are transmitted to two or more RFID tags in the transmission process, the control unit transmits the light emission instructions such that the two or more RFID tags emit light at different timings.

According to the configuration described above, the RFID tags emit light at different timings. For this reason, the tag communication device can identify an RFID tag that emits light on the basis of the light emission instruction more accurately.

In one embodiment, in a case in which (i) tag IDs of two or more RFID tags are acquired in the acquisition process, and (ii) it is determined that light emission of the light emitting unit based on the light emission instruction is present for one RFID tag among the two or more RFID tags in the determination process, the control unit continuously transmits the light emission instruction also to the remaining RFID tags among the two or more RFID tags in the transmission process.

According to the configuration, the tag communication device described above can detect light emission from a plurality of RFID tags. For this reason, the tag communication device can perform a predetermined operation for a plurality of RFID tags.

In one embodiment, the control unit sets a predetermined area within the imaging area of the imaging unit and determines presence/absence of light emission of the light emitting unit based on the light emission instruction within the predetermined area in the determination process.

According to the configuration described above, the tag communication device can determine presence/absence of light emission of the RFID tag for a predetermined area (for example, on a specific production line) also within the imaging area of the imaging unit as a target.

In one embodiment, the control unit: sets two or more predetermined areas within the imaging area of the imaging unit; determines presence/absence of light emission of the light emitting unit based on the light emission instruction within the two or more predetermined areas in the determination process; and performs a different operation for the RFID tag to which the light emission instruction has been transmitted in accordance with one of the two or more predetermined areas in which a position at which the light emission has been detected is included in a case in which it is determined that the light emission of the light emitting unit based on the light emission instruction is present in the operation process.

According to the configuration described above, the tag communication device can determine the presence/absence of light emission of the RFID for two or more predetermined areas (for example, on a production line A and on a production line B) from the inside of the imaging area of the imaging unit. Then, the tag communication device described above can perform a different operation in accordance with the position of the RFID tag. As a specific example, the tag communication device described above can write different information in an RFID tag flowing along the production line A and in an RFID tag flowing along the production line B.

In one embodiment, the control unit performs a different operation for the RFID tag to which the light emission instruction has been transmitted in accordance with a light emission pattern of the light emission in a case in which it is determined that the light emission of the light emitting unit based on the light emission instruction is present in the operation process.

According to the configuration described above, the tag communication device can perform a different operation in accordance with a light emission pattern of the RFID tag. As a specific example, the tag communication device can write different information in an RFID tag emitting red light and in an RFID emitting blue light.

In one embodiment, the predetermined operation in the operation process is at least one of the following (i) and (ii).

(i) reading information from an RFID tag for the RFID tag to which the light emission instruction has been transmitted (ii) writing information in an RFID tag for the RFID tag to which the light emission instruction has been transmitted According to the configuration described above, the tag communication device described above can read/write information from/in the RFID tag.

In addition, the tag communication device described above may be realized by a computer. In such a case, a control program of a tag communication device realizing the tag communication device by using the computer by operating the computer as each of the units described above and a computer-readable recording medium having the control program recorded thereon is also included in the concept of the disclosure.

According to one embodiment of the disclosure, a tag communication device capable of performing an operation for an RFID tag present at a specific position more accurately is provided.

Hereinafter, an embodiment of the disclosure (hereinafter, also denoted as "this embodiment") will be described with reference to the drawings. Although data appearing in this embodiment is described using natural language, more specifically, a computer-recognizable quasi language, a command, a parameter, a machine language, or the like is designated.

In this specification, description will be presented on the basis of an example in which the disclosure is applied to a production line. However, it should be understood that a configuration of the disclosure described in the claims is applicable to various industrial fields other than production lines.

§ 1 Application Example

One example of a view to which the disclosure is applied will be described with reference to FIG. 1. FIG. 1 schematically illustrates one example of a tag communication system including a tag communication device 100 according to this embodiment. The tag communication device 100 performs an operation for RFID tags 200 present on a production line through radio communication (this radio communication is performed through communication units 110 and 210). An example of an operation performed by the tag communication device 100 for the RFID tag 200 includes writing/reading information stored in a storage unit 240 of the RFID tag 200.

In this embodiment, a control unit 130 of the tag communication device 100 causes a light emitting unit 220 included in the RFID tag 200 to emit light. Then, the control unit 130 detects light emission of the light emitting unit 220 on the basis of image information acquired by an imaging unit 120. As a result, the tag communication device 100 identifies the position of an RFID tag 200 on the basis of a radio wave signal and an optical signal, and accordingly, a more accurate position can be identified. For this reason, an operation for an RFID tag 200 present at a specific position can be performed more accurately.

Figure 2:
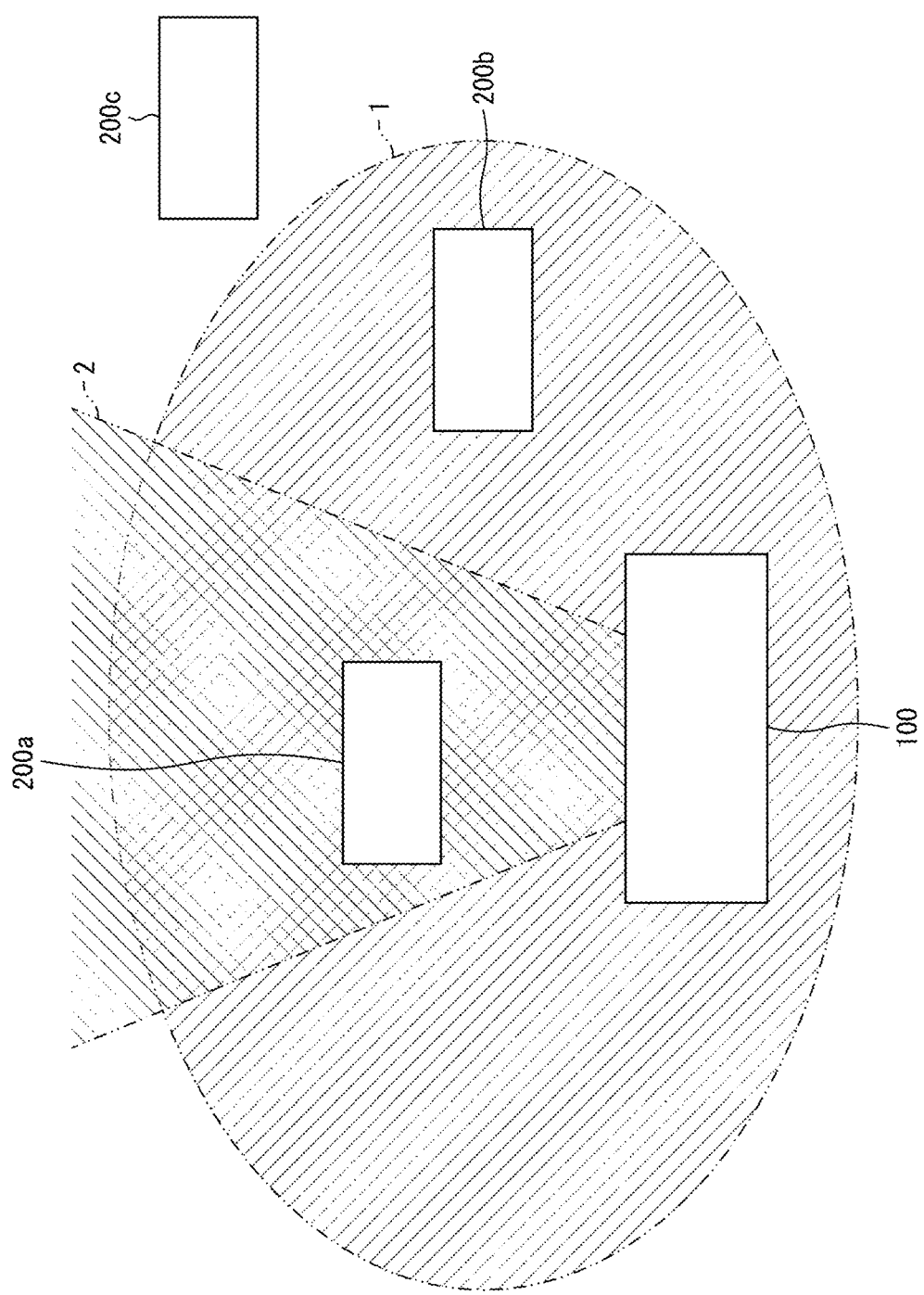
FIG. 2 is a schematic view illustrating a relation between a communicable range of a communication unit and an imaging area of an imaging unit of a tag communication device according to an embodiment of the disclosure.

A relation between a communicable range of the communication unit 110 and an imaging area of the imaging unit 120 will be described with reference to FIG. 2. In the case illustrated in FIG. 2, the communication unit 110 can communicate with RFID tags 200a and 200b present within a communicable range 1 among RFID tags 200a to 200c. Meanwhile, in a case in which the RFID tag 200a present within the imaging area 2 of the imaging unit 120 emits light, the tag communication device 100 can detect the emission thereof. However, although the RFID tags 200b and 200c, which are not within the imaging area 2 of the imaging unit 120, emit light, the tag communication device 100 cannot detect the emission.

By using this relation, the tag communication device 100 can perform an operation only for the RFID tag 200a present at a position included in the imaging area 2 of the imaging unit 120 also in the communicable range 1 of the communication unit 110. In this way, the tag communication device 100 can perform an operation for an RFID tag 200 present at a specific position more accurately.

In addition, it is sufficient for the imaging area 2 of the imaging unit 120 to include at least a part of the communicable range 1 of the communication unit 110. In other words, as illustrated in FIG. 2, the imaging area 2 may include only a part of the communicable range 1, or the imaging area 2 may include the entire communicable range 1.

§ 2 Configuration Example

[Example of Hardware Configuration of Tag Communication Device]

Figure 3:
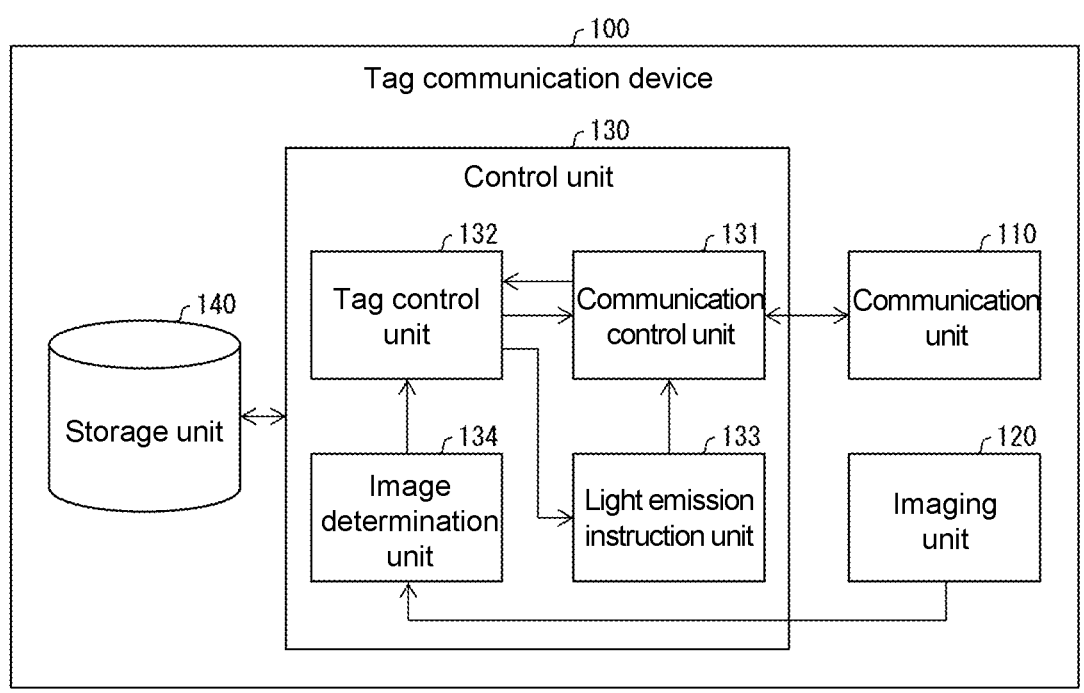
FIG. 3 is a block diagram illustrating a configuration example of a main part of a tag communication device according to an embodiment of the disclosure.

FIG. 3 is a block diagram illustrating a configuration example of a main part of the tag communication device 100. The tag communication device 100 includes a communication unit 110, an imaging unit 120, and a control unit 130. In addition, in order to enable the device to function, the tag communication device 100 may include a storage unit 140.

The communication unit 110 communicates with an RFID tag 200 using radio waves. The communication unit 110 transmits information received from a communication control unit 131 to the outside as radio waves and converts radio waves received from the outside into information and transmits the converted information to the communication control unit 131. More specifically, the communication unit 110 is composed of an antenna, a resonant circuit, a modulation/demodulation circuit, an RF circuit, and the like.

The imaging unit 120 acquires image information. The image information acquired by the imaging unit 120 is transmitted to an image determination unit 134 and is analyzed by the image determination unit 134. More specifically, the imaging unit 120 is configured by various cameras and the like.

The control unit 130 performs overall control of processes executed inside the tag communication device 100. The control unit 130, for example, is configured by a personal computer (PC)-based computer. The control of processes performed by the tag communication device 100 is performed by causing a computer to execute a control program. This program may be in (i) a form in which the program recorded on a removable medium (a CD-ROM or the like) is read and used, (ii) a form in which the program installed in a hard disk or the like is read and used, or (iii) a form in which the program is downloaded through an external I/F, is installed in a hard disk or the like, and is executed.

Functional blocks included in the control unit 130 will be described later in "Example of software configuration."

The storage unit 140 is configured using a nonvolatile storage device (a hard disk or the like). As details stored in the storage unit 140, there are the control program described above, an operating system (OS) program, and various other programs and various kinds of data.

[Example of Software Configuration of Tag Communication Device]

The control unit 130 includes a communication control unit 131, a tag control unit 132, a light emission instruction unit 133, and an image determination unit 134.

The communication control unit 131 is a functional block that controls the function of the communication unit 110 and exchanges information with the communication unit 110. The communication control unit 131 transmits information acquired from radio waves received by the communication unit 110 to other functional blocks. In addition, the communication control unit 131 transmits information received from other functional blocks to the communication unit 110 and causes the information to be converted into radio waves and transmitted.

The tag control unit 132 is a functional block that generates information to be transmitted to an RFID tag 200 and processes information received from an RFID tag 200. As one example, the tag control unit 132 acquires a tag identification (ID) of an RFID tag 200 with which the communication unit 110 communicates. As another example, the tag control unit 132 generates an instruction of details for performing a predetermined operation for a specific RFID tag 200 on the basis of a result of determination transmitted from the image determination unit 134.

The light emission instruction unit 133 is a functional block that generates an instruction of details for causing the light emitting unit 220 included in an RFID tag 200 to emit light (hereinafter denoted as a "light emission instruction") for the RFID tag 200 having a specific tag ID.

The image determination unit 134 is a functional block that determines presence/absence of light emission of the light emitting unit 220 based on a light emission instruction within the imaging area of the imaging unit 120. In other words, the image determination unit 134 is a functional block that determines whether or not light emission of the light emitting unit 220 based on a light emission instruction is included in the image information acquired by the imaging unit 120.

[Configuration Example of RFID Tag]

On the right side in FIG. 1, a block diagram illustrating a configuration example of a main part of the RFID tag 200 is drawn. As illustrated in the drawing, the RFID tag 200 includes a communication unit 210, a light emitting unit 220, a control unit 230, and a storage unit 240.

The communication unit 210 communicates with the tag communication device 100 using radiowaves. The communication unit 210 transmits information received from the control unit 230 to the outside as radiowaves and converts radiowaves received from the outside into information and transmits the converted information to the control unit 230. In addition, in a case in which the RFID tag 200 is a passive-type RFID tag having no independent power source, the communication unit 210 also has a role for receiving a power source operating the control unit 230. The communication unit 210, more specifically, is composed of an antenna, a resonant circuit, an analog-to-digital (A/D) conversion circuit, a digital-to-analog (D/A) conversion circuit, a modulation/demodulation circuit, an RF circuit, and the like.

The light emitting unit 220 emits light in accordance with reception of a light emission instruction transmitted from the tag communication device 100. In more detail, after receiving a light emission instruction transmitted from the tag communication device 100 through the communication unit 210, the light emitting unit 220 emits light in accordance with reception of a command from the control unit 230. More specifically, the light emitting unit 220 is configured by various light emitting devices and the like.

The control unit 230 performs overall control of processes performed inside the RFID tag 200. The control unit 230 includes a logic operation circuit, a register, and the like and functions as a computer. The control of processes performed by the RFID tag 200 is performed by causing a computer to execute a control program. This program, for example, may be in (i) a form in which the program installed in a read only memory (ROM) of the storage unit 240 or the like is read and used or (ii) a form in which the program which has been downloaded from the tag communication device 100 through the communication unit 210 and installed in the storage unit 240 is executed.

In addition, the control unit 230 stores information received from the tag communication device 100 in the storage unit 240 on the basis of the information received from the tag communication device 100 through the communication unit 210. In addition, the control unit 230 reads information stored in the storage unit 240 and transmits the read information to the tag communication device 100 through the communication unit 210 or causes the light emitting unit 220 to emit light.

The storage unit 240 is configured by a semiconductor memory such as the ROM described above, a static RAM (SRAM), or a ferroelectric memory (FeRAM). As information stored in the storage unit 240, there are the control program described above, other various programs, and various kinds of data.

§ 3 Example of Process

An example of the process of the tag communication device 100 will be described with reference to the flowchart illustrated in FIG. 4. The process sequence described below is merely one example, and each process may be changed as possible as can be. In addition, in the process sequence described below, steps may be omitted, substituted, and added in accordance with an embodiment as is appropriate.

Figure 4:
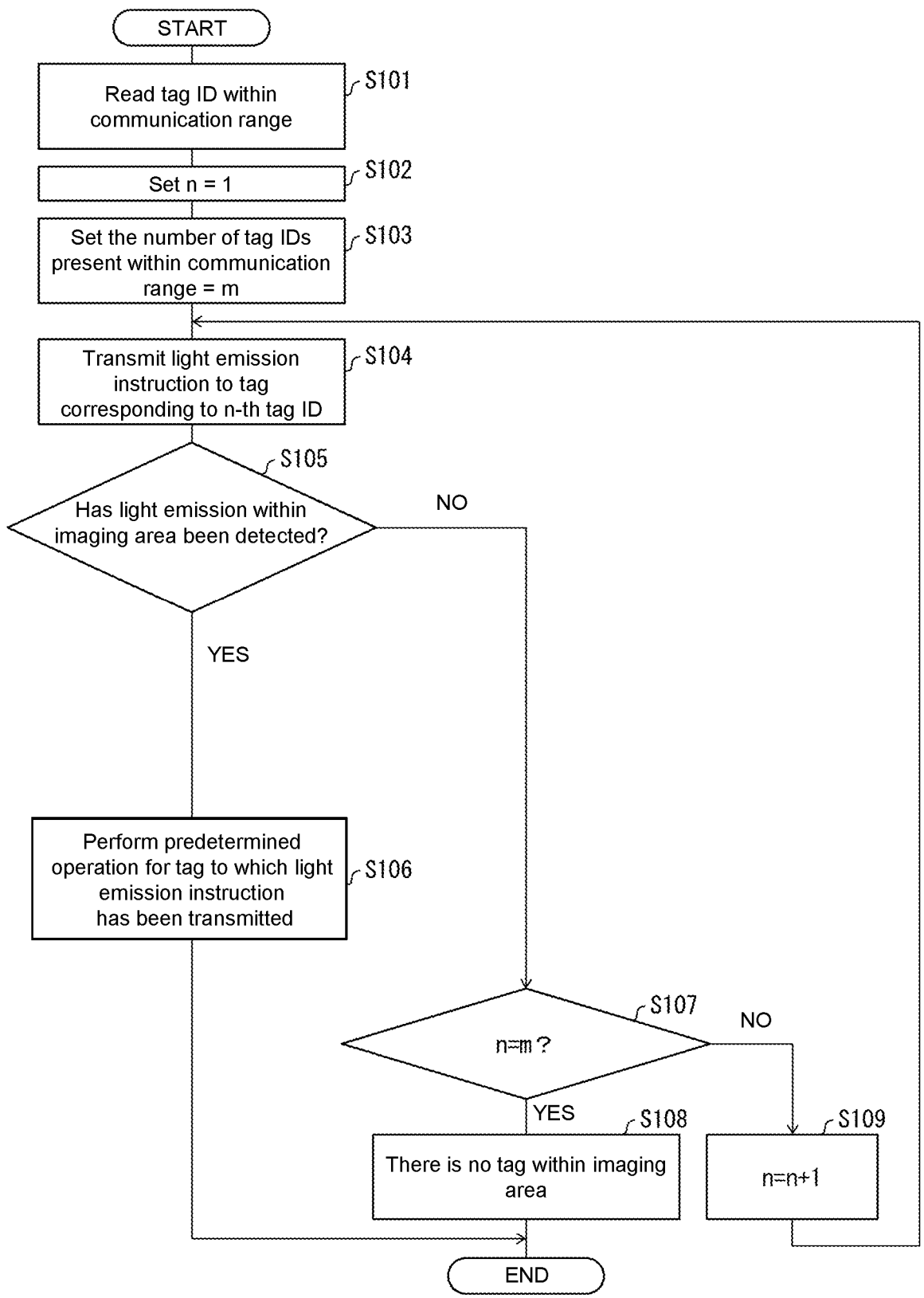
FIG. 4 is a flowchart illustrating an example of the process of a tag communication device according to an embodiment of the disclosure.

According to the flowchart illustrated in FIG. 4, as an overview, when light emission of the light emitting unit 220 is detected once within the imaging area of the imaging unit 120, a predetermined operation is performed for an RFID tag 200 having the light emitting unit 220, and the process is completed. Accordingly, the example of the process illustrated in FIG. 4 is preferably used for a tag communication system in which a maximum number of RFID tags 200 included within the imaging area of the imaging unit 120 is one. Such a tag communication system, for example, can be realized by appropriately adjusting the arrangement of the imaging unit 120. More specifically, this example of the process can be appropriately applied to a case in which a camera (the imaging unit 120) having a narrow imaging area is disposed near a production line, and only an RFID tag 200 passing before the camera is included in the imaging area.

(S101)

In S101, the tag communication device 100 reads a tag ID present within the communication range. In more detail, this step is executed by the following sub steps.

(i) The communication control unit 131 causes the communication unit 110 to communicate with an RFID tag 200 that can be communicated with the communication unit 110.

(ii) The communication control unit 131 receives information relating to the RFID tag 200 with which the communication unit 110 has communicated in (i) from the communication unit 110 and transmits the received information to the tag control unit 132.

(iii) The tag control unit 132 acquires a tag ID of the RFID tag 200 with which the communication unit 110 has communicated in (i) on the basis of the information received in (ii).

S101 corresponds to an "acquisition process/acquisition step" of the disclosure.

(S102)

In S102, n is changed to "n=1." Here, n is a parameter used for causing the control unit 130 to perform a process for an n-th tag ID. Accordingly, S102 is a step in which the parameter is reset such that the process is started from the first tag ID.

(S103)

In S103, the number of tag IDs present within the communication range is acquired. This step is executed by the tag control unit 132 acquiring the number of tag IDs acquired in S101. For the following description, the number of tag IDs acquired in S103 is assumed to be m.

(S104)

In S104, a light emission instruction is transmitted to an RFID tag 200 corresponding to the n-th tag ID. Here, in a case in which the process proceeds from S103 to S104, n=1. On the other hand, in a case in which the process proceeds from S109 to S104, n is set in S109 to be described later. In more detail, this step is executed by the following sub steps.

(i) The tag control unit 132 transmits the n-th tag ID to the light emission instruction unit 133.

(ii) The light emission instruction unit 133, for an RFID tag 200 corresponding to the n-th tag ID, generates an instruction (light emission instruction) of details causing the light emitting unit 220 included in the RFID tag 200 to emit light.

(iii) The generated light emission instruction is transmitted through the communication control unit 131 and the communication unit 110.

S104 corresponds to a "transmission process/transmission step" of the disclosure.

After S104, the RFID tag 200 that has received the transmitted light emission instruction causes the light emitting unit 220 to emit light. At this time, the light emitting unit 220 of the "RFID tag 200 corresponding to the n-th tag ID" described above emits light.

(S105)

In S105, it is determined whether or not light emission has been detected within the imaging area of the imaging unit 120. This step is executed by the image determination unit 134 determining whether or not light emission of the light emitting unit 220 based on the light emission instruction transmitted in S104 is included in the image information acquired by the imaging unit 120. A result of the determination is transmitted to the tag control unit 132. Then, the process proceeds to S106 in a case in which light emission has been detected and proceeds to S107 in a case in which light emission has not been detected.

S105 corresponds to a "determination process/determination step" of the disclosure.

(S106)

In S106, a predetermined operation is performed for the RFID tag 200 to which the light emission instruction has been transmitted in S104. In more detail, this step is executed by the following sub steps.

(i) The tag control unit 132 generates an instruction of details performing a predetermined operation for the RFID tag 200 to which the light emission instruction has been transmitted in S104 (in other words, the RFID tag 200 corresponding to the n-th tag ID).

(ii) The instruction generated in (i) is transmitted to the RFID tag 200 through the communication control unit 131 and the communication unit 110. In one example, the RFID tag 200 writes information in the storage unit 240 in accordance with the instruction described above. In another example, the RFID tag 200 reads information from the storage unit 240 in accordance with the instruction described above and transmits the read information through the communication unit 210.

S106 corresponds to an "operation process/operation step" of the disclosure.

(S107)

In S107, it is determined whether or not n=m. In more detail, the tag control unit 132 determines whether or not a value of n given in S104 is the same as a value of m acquired in S103. A case in which n=m is a case in which (i) a light emission instruction is transmitted to all the m RFID tags 200 corresponding to m tag IDs, and (ii) light emission based on the light emission instruction has not been detected. At this time, the process proceeds to S108. On the other hand, a case in which n m is a case in which there is an RFID tag 200 to which a light emission instruction has not been transmitted among m RFID tags 200 corresponding to m tag IDs. At this time, the process proceeds to S109.

(S108)

In S108, the tag control unit 132 determines that no RFID tag 200 is present within the imaging area and ends the process. This step corresponds to a case in which an RFID tag 200 is present in the communicable range, but no RFID tag 200 is present within the imaging area of the imaging unit 120. In one example, this situation corresponds to a situation in which an area in which the communication unit 110 can communicate is larger than the imaging area of the imaging unit 120. Even in such a case, the tag communication device 100 does not perform a certain operation for the RFID tag 200 that is not present at a specific position.

(S109)

In S109, the tag control unit 132 causes the process to proceed to S104 with n=n+1. In other words, while the process for the n-th tag ID has been performed in a routine until now, the tag control unit 132 changes the parameter such that the process for the (n+1)-th tag ID is performed.

§ 4 Modified Example

As above, while the embodiment of the disclosure has been described in detail, the description presented above is merely an example of the disclosure. It is apparent that various improvements and modifications can be performed without departing from the scope of the disclosure. For example, the following changes can be performed. Hereinafter, the same reference numerals will be assigned to the same constituent elements as those of the embodiment described above, and description of points similar to those of the embodiment described above will be omitted as is appropriate. The following modified examples can be combined as is appropriate.

[4-1]

In the example of the process described in "§ 3," while the process goes through a routine of S104=>S105=>S107=>S108=>S104, one light emission instruction is sequentially transmitted each time to the RFID tag 200 with which communication is performed in S101. However, these light emission instructions may be simultaneously transmitted to two or more RFID tags 200. At this time, in a case in which light emission instructions are transmitted such that two or more RFID tags 200 emit light at different timings, the two or more RFID tags 200 can be distinguished from each other, which is preferable.

In order to simultaneously transmit light emission instructions to two or more RFID tags 200 and cause the two or more RFID tags 200 to emit light at different timings, for example, an emission timing may be designated in each light emission instruction. As a specific example, in a case in which the tag communication device 100 transmits light emission instructions of details indicating that an RFID tag having a tag ID "0001" is caused to emit light after one to two seconds using a transmission time of the light emission instructions as a reference and an RFID tag having a tag ID "0002" is caused to emit light after two to three seconds, the two RFID tags can emit light at different timings.

[4-2]

A modified example of the process example of the tag communication device 100 described with reference to FIG. 4 will be described with reference to FIG. 5. In a flowchart illustrated in FIG. 5, after S106, the process proceeds to S107a in which it is determined whether or not n=m, which is different from the flowchart illustrated in FIG. 4. The processes of S101 to S106 are as described in "§ 3."

In a case in which n=m in S107a (in a case in which transmission of light emission instructions to all the m RFID tags 200 has been completed), the tag control unit 132 ends the process. On the other hand, in a case in which n m (in a case in which there is an RFID tag 200 to which a light emission instruction has not been transmitted), the process proceeds to S109a. In S109a, the process proceeds to S104 with n=n+1 (the process of S109a is the same as that of S109 described above).

Figure 5:
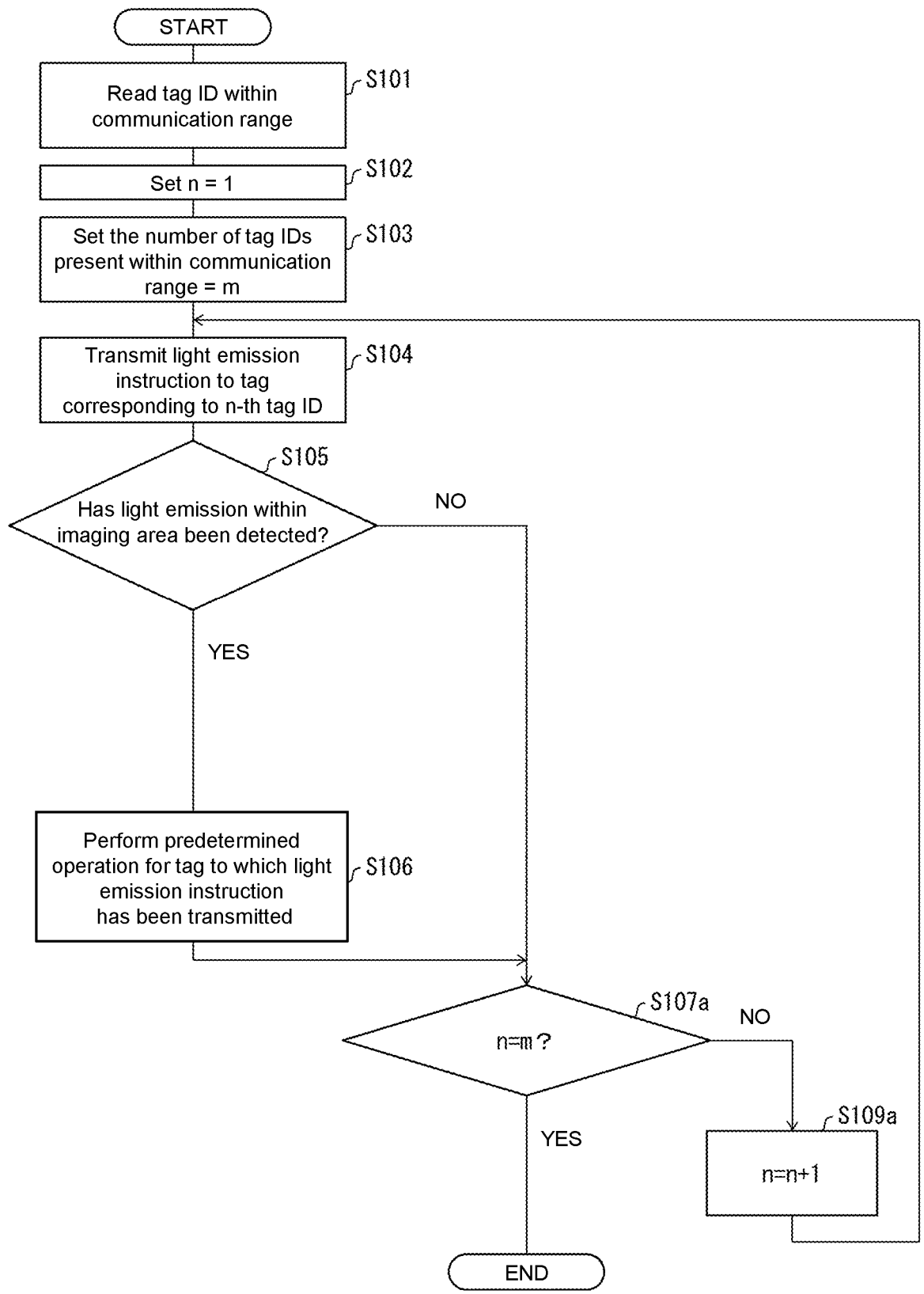
FIG. 5 is a flowchart illustrating an example of a process of a tag communication device of a modified example (4-2) of the disclosure.

In the flowchart illustrated in FIG. 5, as an overview, even in a case in which the communication unit 110 can communicate with two or more RFID tags 200, and light emission has been detected from one RFID tag 200, the transmission of a light emission instruction is continued to be performed. At this time, in a case in which light emission of the light emitting unit 220 based on a light emission instruction has been detected within the imaging area of the imaging unit 120 a plurality of number of times, a predetermined operation is performed for each RFID tag 200. Accordingly, the process example as illustrated in FIG. 5 may be preferably used for a tag communication system in which a maximum number of RFID tags 200 that may be included within the imaging area of the imaging unit 120 is two or more. Such a tag communication system, for example, can be achieved by appropriately adjusting the arrangement of the imaging unit 120. As a specific example, in a case in which a camera (the imaging unit 120) having a wide imaging area is disposed at a position far from a production line, and a plurality of RFID tags 200 flowing along the production line may be included in the imaging area, this process may be appropriately applied.

In addition, in S107a, instead of determining whether or not n=m, it may be determined whether or not n=m' (here, m' is an integer satisfying 2≤m'≤m). In other words, in this modified example, it is not necessarily required to transmit light emission instructions to all the tag IDs acquired in S101.

[4-3]

Figure 6:
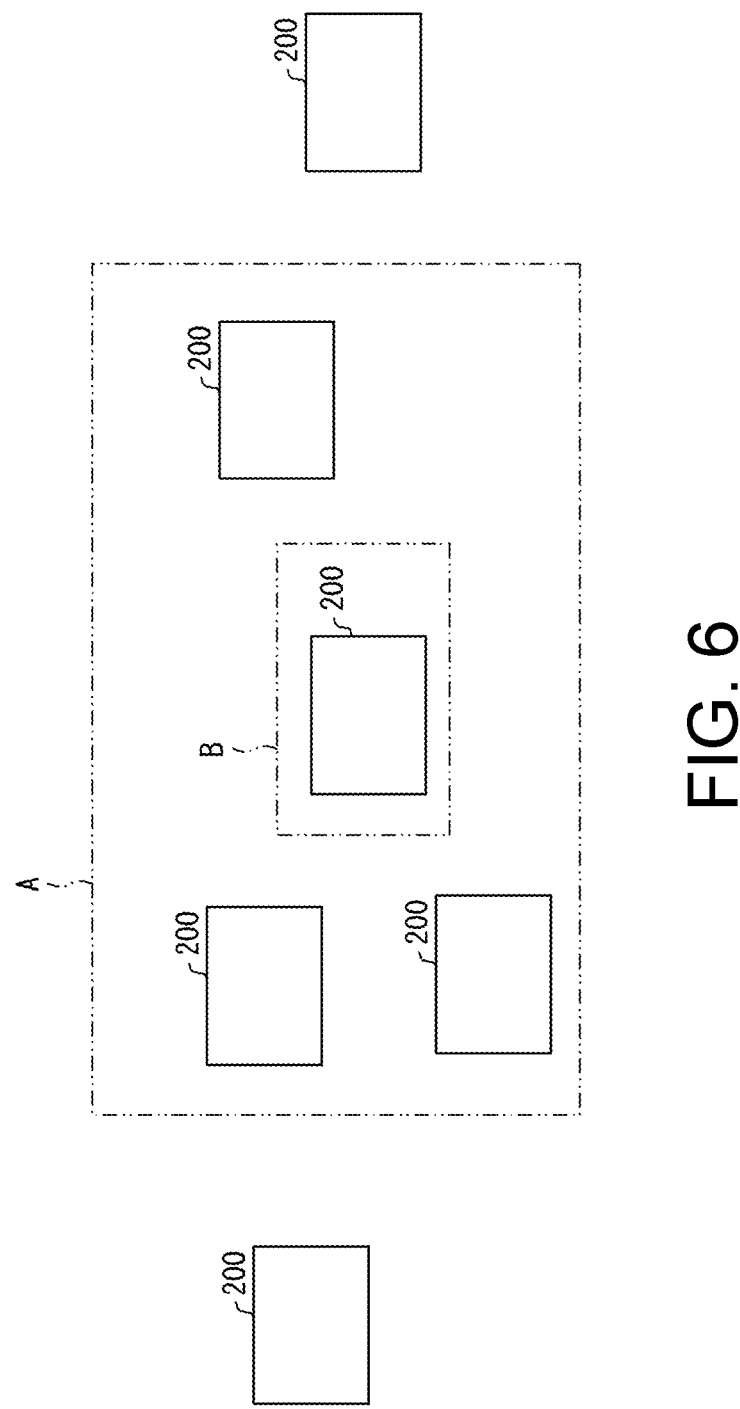
FIG. 6 is a schematic view illustrating a relation between an imaging area A of an imaging unit and a predetermined area B set within the imaging area in a modified example (4-3) of the disclosure.

A modified example of the process performed by the image determination unit 134 will be described with reference to FIG. 6. FIG. 6 schematically illustrates a relation between an imaging area A of the imaging unit 120 and a predetermined area B set within the imaging area. Here, the image determination unit 134 may set a predetermined area B that is not the entire imaging area A of the imaging unit 120 but is a part of the entire imaging area A of the imaging unit 120 and detect light emission of the light emitting unit 220 within the predetermined area B. In the example illustrated in FIG. 6, while four RFID tags 200 are included in the imaging area A, only one RFID tag is included in the predetermined area B. Accordingly, in a case in which light emission of the light emitting unit 220 within the predetermined area B is detected, only the RFID tag 200 disposed at the center is detected.

The predetermined area B may be arbitrarily set. As one example, a limited area on a production line may be set as the predetermined area B. In this way, by setting the predetermined area B, an operation is performed only for the RFID tag 200 positioned in the predetermined area B, and an operation may not be performed for an RFID tag 200, which is present near the predetermined area B, disposed outside the predetermined area B. As a more specific example, in a case in which RFID tags 200 continuously flow on a production line, an operation is performed only for a specific RFID tag 200, and an erroneous operation for RFID tags 200 adjacent to the specific RFID tag 200 can be prevented.

As another example, an area through which an RFID tag 200 is estimated to pass (for example, on a specific production line) may be set as the predetermined area B. By setting the predetermined area B in this way, light emission can be detected at a place, into which the imaging area A is narrowed down, to be focused. As a result, erroneous detection due to noise having no relation with light emission of the light emitting unit 220 can be reduced. In addition, the arrangement position of the imaging unit 120 can be selected in a wide range.

Figure 7:
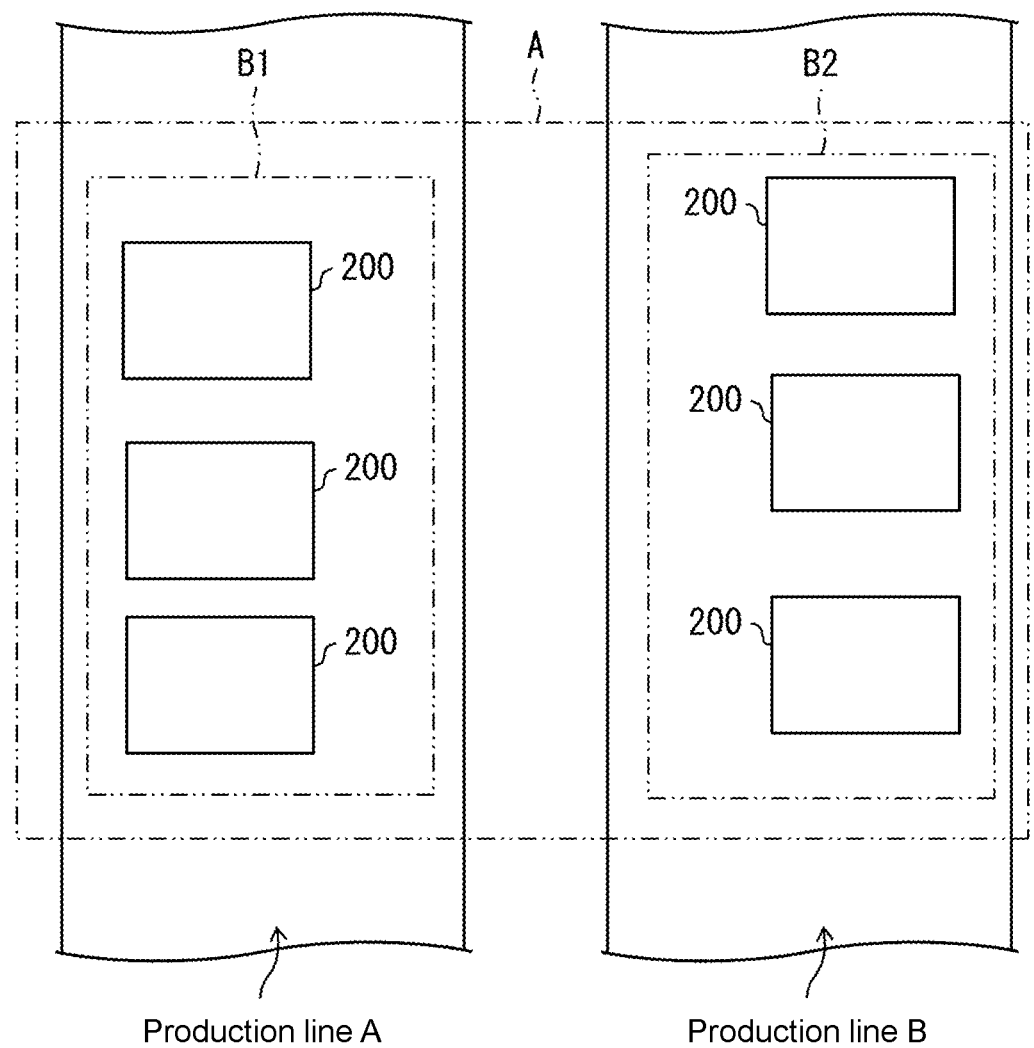
FIG. 7 is a schematic view illustrating relations between an imaging area A of an imaging unit and two predetermined areas B1 and B2 set within the imaging area in the modified example (4-3) of the disclosure.

As illustrated in FIG. 7, two or more predetermined areas B may be set. FIG. 7 schematically illustrates relations between an imaging area A of the imaging unit 120 and two predetermined areas B1 and B2 set within the imaging area.

In such a case, a different operation may be performed for the RFID tag 200 in accordance with one of two or more predetermined areas in which light emission of the light emitting unit 220 has been detected. In an example illustrated in FIG. 7, the predetermined area B1 corresponds to a production line A, and the predetermined area B2 corresponds to a production line B. In this case, in accordance with the following steps, different operations can be performed for RFID tags 200 flowing along the lines.

(i) The image determination unit 134 determines one of the areas B1 and B2 in which light emission of the light emitting unit 220 has been detected. A result of the determination is transmitted to the tag control unit 132.

(ii) In a case in which light emission has been detected in the area B1, the tag control unit 132 generates an instruction of details for performing an operation according to the production line A for the RFID tag 200 to which the light emission instruction has been transmitted. On the other hand, in a case in which light emission has been detected in the area B2, the tag control unit 132 generates an instruction of details for performing an operation according to the production line B for the RFID tag 200 to which the light emission instruction has been transmitted.

(iii) The instructions generated in (ii) is transmitted to the RFID tag 200 through the communication control unit 131 and the communication unit 110. In one example, the RFID tag 200 write information in the storage unit 240 on the basis of the instruction. In another example, the RFID tag 200 reads information from the storage unit 240 on the basis of the instruction described above and transmits the read information through the communication unit 210.

[4-4-1]

Figure 8:
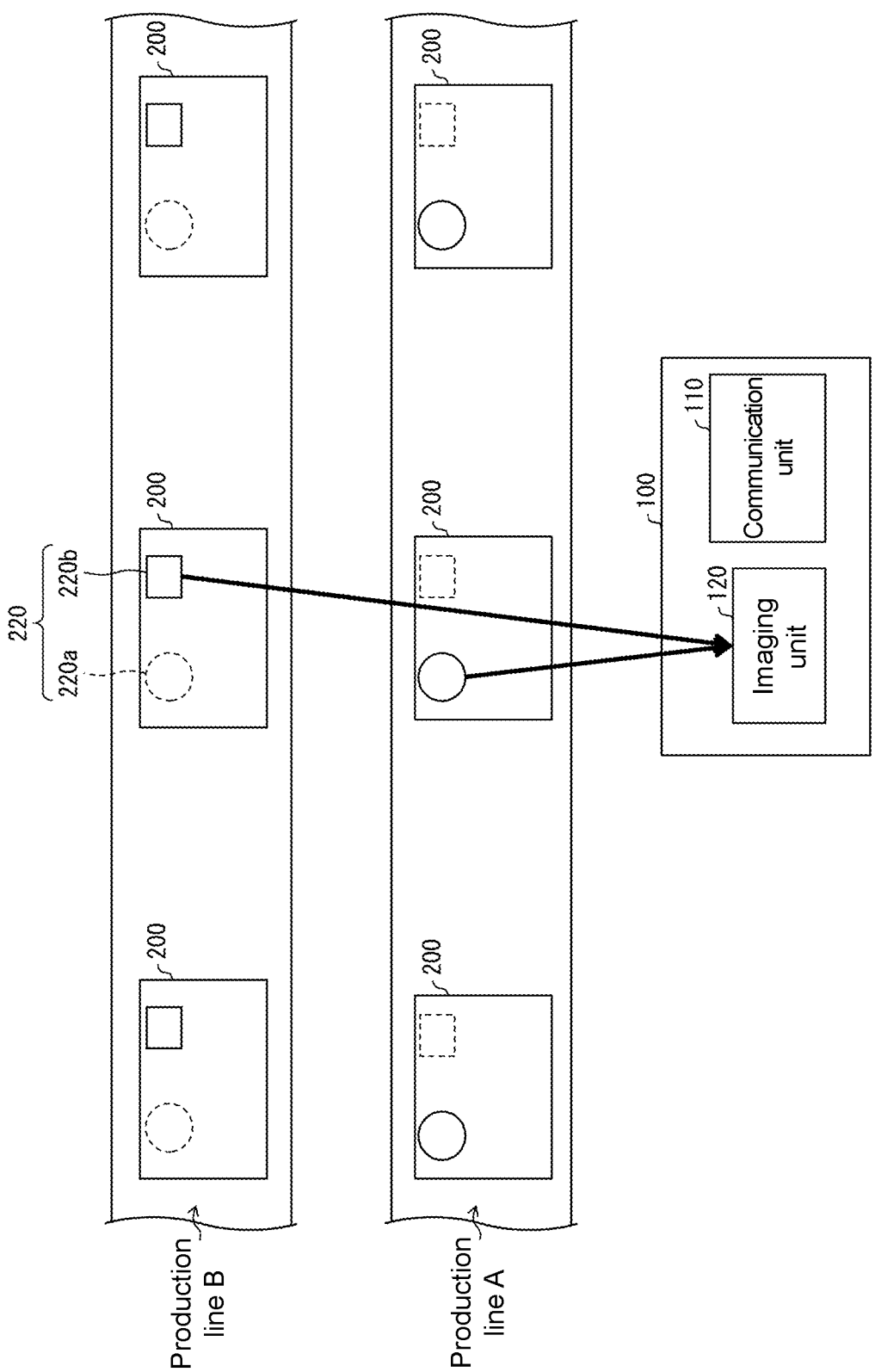
FIG. 8 is an overview diagram of a tag communication system of modified examples (4-4-1 and 4-4-2) of the disclosure.

A modified example employing a light emitting unit 220 having two or more light emission patterns will be described with reference to FIG. 8. FIG. 8 is an overview diagram of a tag communication system of such a modified example. As illustrated in FIG. 8, the light emitting unit 220 included in the RFID tag 200 is composed of two sub light emitting units 220a and 220b. When a light emission instruction is received, the sub light emitting unit 220a emits light in a production line A, and the sub light emitting unit 220b emits light in a production line B. The tag communication device 100 performs a different operation for the RFID tag 200 in accordance with one of the sub light emitting unit 220a and the sub light emitting unit 220b that emits light (in other words, in accordance with a light emission pattern of the light emitting unit 220).

FIG. 9A is one example of the data configuration of data that is referred to by the RFID tag 200 in this modified example. Hereinafter, one example of a process in which the control unit 230 changes a light emission pattern on the basis of such data will be described.

(i) In the storage unit 240 of a RFID tag 200, a digit corresponding to the RFID tag 200 and correspondence data between a digit and a light emission pattern as illustrated in FIG. 9A are stored in advance. This process can be executed by writing information in the RFID tag 200 in advance using a tag communication device (the tag communication device used at this time does not need to be the tag communication device according to one embodiment of the disclosure).

(ii) When a light emission instruction is accepted through the communication unit 210, the control unit 230 reads information from the storage unit 240 and refers to a digit corresponding to the RFID tag 200 and the correspondence data between the digit and the light emission pattern stored in (i).

(iii) The control unit 230 causes the light emitting unit 220 to emit light in a specific light emission pattern on the basis of a result of the referring in (ii).

Figure 10:
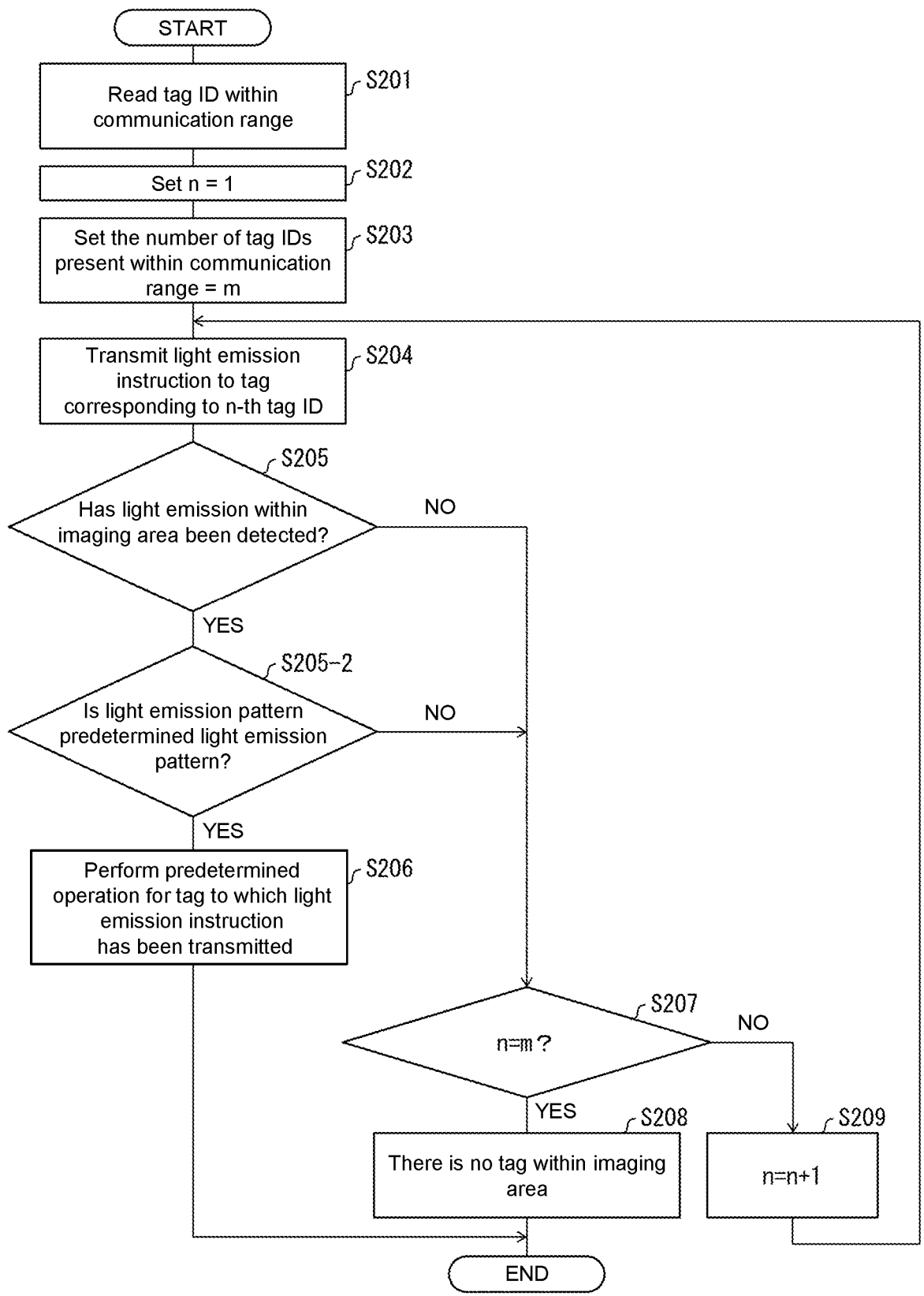
FIG. 10 is a flowchart illustrating the process of a tag communication device of the modified example (4-4-1) of the disclosure.

A process example of this modified example will be described with reference to FIGS. 9B and 10. FIG. 9B is one example of the data configuration of data to which the tag communication device refers in this modified example. FIG. 10 is a flowchart illustrating the process of the tag communication device 100 in this modified example.

In the flowchart illustrated in FIG. 10, similar to the flowchart illustrated in FIG. 4, when light emission of the light emitting unit 220 is detected once, a predetermined operation is performed for an RFID tag 200 having the light emitting unit 220, and the process is completed. Accordingly, the process example illustrated in FIG. 10 is preferably used for a communication system in which (i) a maximum number of RFID tags 200 that may be included within the imaging area of the imaging unit 120 is one, and (ii) the light emitting unit 220 is configured to emit light in two or more light emission patterns.

(S205)

In S205, it is determined whether or not light emission has been detected within the imaging area of the imaging unit 120. A method of executing determination is the same as that of S105. In a case in which light emission has been detected, the process proceeds to S205-2 (this is different from the flowchart illustrated in FIG. 4). On the other hand, in a case in which light emission has not been detected, the process proceeds to S207.

(S205-2)

In S205-2, the image determination unit 134 determines whether or not a light emission pattern of the light emission detected in S205 is a predetermined light emission pattern. As a specific example, the image determination unit 134 determines an emission color of the light emission detected in S205.

(S206)

In S206, a predetermined operation is performed for the RFID tag 200 on the basis of a result of the determination in S205-2. At this time, the tag control unit 132 reads correspondence data between a light emission pattern and an operation as illustrated in FIG. 9B as an example from the storage unit 140 and preforms a predetermined operation by referring to the read information. In this way, the tag communication device 100 can perform a different operation for an RFID tag 200 having a different light emission pattern. Alternatively, the tag communication device 100 can also perform a predetermined operation only for an RFID tag emitting light in a predetermined light emission pattern.

The processes of S201 to S204 and S207 to S209 are the same as the processes of S101 to S104 and S107 to S109 described in "§ 3," and thus description thereof will not be presented here.

In the description presented above, while the light emitting unit 220 has been described to be able to emit light in two or more light emission patterns, two or more types of RFID tags 200 each including a light emitting unit 220 having only one light emission pattern may be prepared. As a specific example, also according to an embodiment in which an RFID tag (blue) including a light emitting device that emits blue light and an RFID tag (red) including a light emitting device that emits red light are prepared, and the RFID tag (blue) and the RFID tag (red) are used to be distinguished for each production line, effect similar to those described above can be acquired.

In addition, in the description presented above, the light emission patterns are distinguished by using different emission colors, the emission patterns may be distinguished using any other method. For example, the shapes of light emitting units 220 may be differently configured, or flashing patterns of light emitting units 220 may be differently configured.

[4-4-2]

Figure 11:
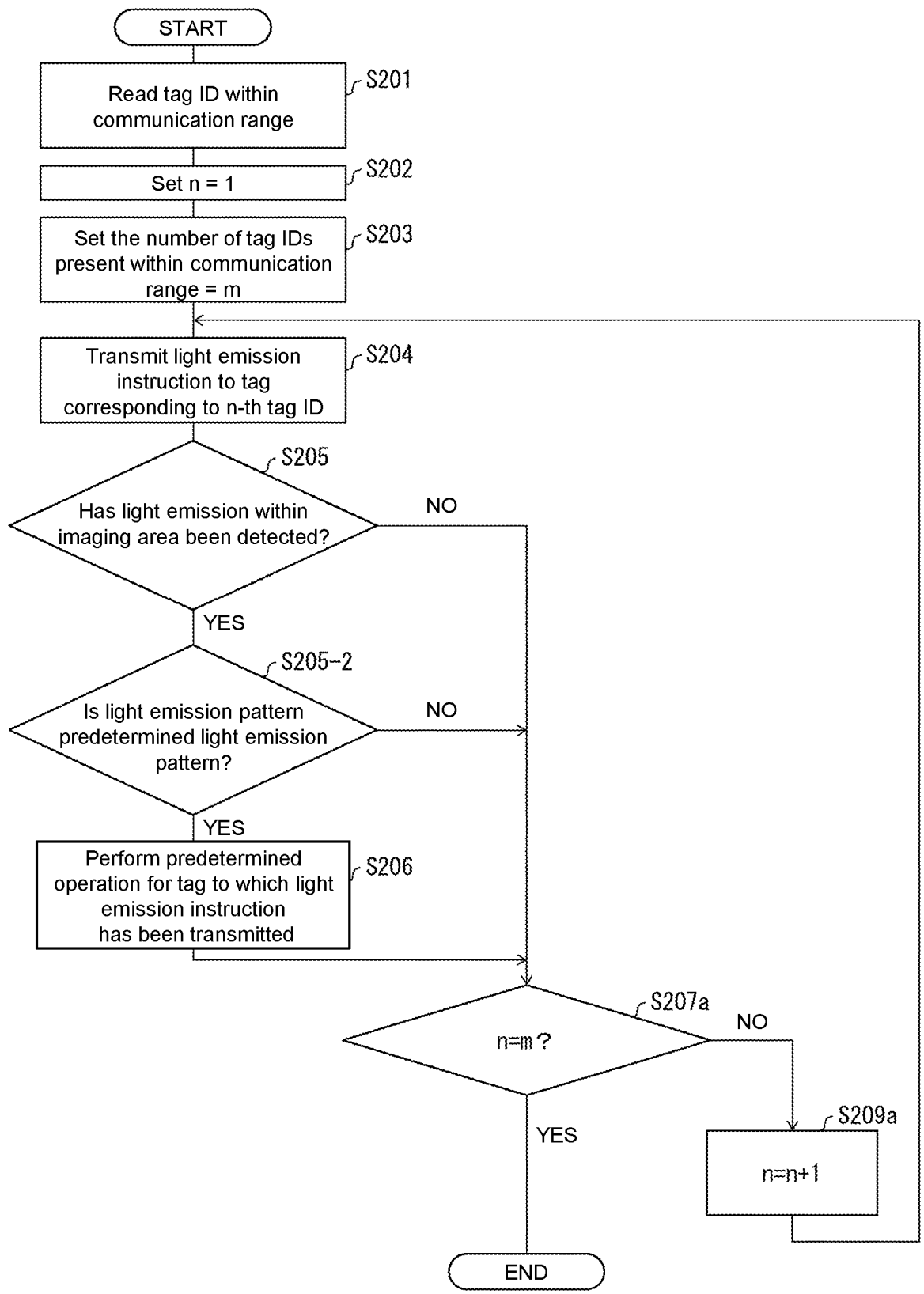
FIG. 11 is a flowchart illustrating a modified example of the process of a tag communication device of the modified example (4-4-2) of the disclosure.

A modified example of the process example of the tag communication device 100 described with reference to FIG. 10 will be described with reference to FIG. 11. In a flowchart illustrated in FIG. 11, also after S206, the process proceeds to S207a in which it is determined whether or not n=m, which is different from the flowchart illustrated in FIG. 10. The flowchart illustrated in FIG. 11 is acquired by applying the process in which "the communication unit 110 can communicate with two or more RFID tags 200, and transmission of a light emission instruction is continued even in a case in which light emission from one RFID tag 200 has been detected" described in [4-2] to the flowchart illustrated in FIG. 10. Accordingly, the process example as illustrated in FIG. 11 is preferably used for a communication system in which (i) a maximum number of RFID tags 200 that may be included within the imaging area of the imaging unit 120 is two or more, and (ii) the light emitting unit 220 can emit light in two or more light emission patterns.

In addition, in S207a, instead of determining whether or not n=m, it may be determined whether or not n=m' (here, m' is an integer satisfying 2≤m'≤m). In other words, in this modified example, it is not necessarily required to transmit light emission instructions to all the tag IDs acquired in S201.

[Example of Realization Using Software]

The control blocks of the tag communication device 100 (particularly, the control unit 130, the communication control unit 131, the tag control unit 132, the light emission instruction unit 133, and the image determination unit 134) may be realized by a logic circuit (hardware) formed on an integrated circuit (IC chip) or the like or may be realized by software.

In the latter case, the tag communication device 100 includes a computer that executes commands of a program that is software realizing each function. This computer, for example includes one or more processors and includes a computer-readable recording medium having the program stored thereon. Then, in the computer described above, the processor reads the program described above from the recording medium and executes the read program. As the processor described above, for example, a central processing unit (CPU) may be used. As the recoding medium, a "non-transitory type medium" such as a read only memory (ROM), a tape, a disk, a card, a semiconductor memory, a programmable logic circuit, or the like may be used. In addition, a random access memory (RAM) or the like in which the program described above is expanded may be further included. Furthermore, the program described above may be supplied to the computer through an arbitrary transmission medium (a communication network or a broadcast wave, or the like) that can transmit the program. In addition, one embodiment of the disclosure may be realized in the form of a carrier wave-embedded data signal in which the program described above is implemented through electronic transmission.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A tag communication device performing radio communication with a radio frequency identifier (RFID) tag comprising a light emitting unit, the tag communication device comprising:
   a communication unit that performs radio communication with the RFID tag;
   an imaging unit that images at least a part of a communicable range of the communication unit; and
   a control unit,
   wherein the control unit performs:
   an acquisition process of acquiring a tag identification (ID) of one or more RFID tags present in the communicable range of the communication unit through the communication unit;
   a transmission process of transmitting a light emission instruction to at least some of RFID tags corresponding to the acquired tag ID through the communication unit;
   a determination process of determining presence/absence of light emission of the light emitting unit based on the light emission instruction within an imaging area of the imaging unit on the basis of a result of imaging acquired by the imaging unit; and
   an operation process of performing a predetermined operation for an RFID tag to which the light emission instruction has been transmitted through the communication unit in a case in which it is determined that light emission of the light emitting unit based on the light emission instruction is present, wherein in a case in which light emission instructions are transmitted to two or more RFID tags in the transmission process, the control unit transmits the light emission instructions such that the two or more RFID tags emit light at different timings.

2. The tag communication device according to claim 1, wherein, in a case in which (i) tag IDs of two or more RFID tags are acquired in the acquisition process, and (ii) it is determined that light emission of the light emitting unit based on the light emission instruction is present for one RFID tag among the two or more RFID tags in the determination process, the control unit continuously transmits the light emission instruction also to the remaining RFID tags among the two or more RFID tags in the transmission process.

3. The tag communication device according to claim 2, wherein the control unit sets a predetermined area within the imaging area of the imaging unit and determines presence/absence of light emission of the light emitting unit based on the light emission instruction within the predetermined area in the determination process.

4. The tag communication device according to claim 2, wherein the control unit performs a different operation for the RFID tag to which the light emission instruction has been transmitted in accordance with a light emission pattern of the light emission in a case in which it is determined that the light emission of the light emitting unit based on the light emission instruction is present in the operation process.

5. The tag communication device according to claim 2, wherein the predetermined operation in the operation process is at least one of the following (i) and (ii),
   (i) reading information from an RFID tag for the RFID tag to which the light emission instruction has been transmitted
   (ii) writing information in an RFID tag for the RFID tag to which the light emission instruction has been transmitted.

6. The tag communication device according to claim 1, wherein the control unit sets a predetermined area within the imaging area of the imaging unit and determines presence/absence of light emission of the light emitting unit based on the light emission instruction within the predetermined area in the determination process.

7. The tag communication device according to claim 6, wherein the control unit:
   sets two or more predetermined areas within the imaging area of the imaging unit;
   determines presence/absence of light emission of the light emitting unit based on the light emission instruction within the two or more predetermined areas in the determination process; and
   performs a different operation for the RFID tag to which the light emission instruction has been transmitted in accordance with one of the two or more predetermined areas in which a position at which the light emission has been detected is included in a case in which it is determined that the light emission of the light emitting unit based on the light emission instruction is present in the operation process.

8. The tag communication device according to claim 7, wherein the control unit performs a different operation for the RFID tag to which the light emission instruction has been transmitted in accordance with a light emission pattern of the light emission in a case in which it is determined that the light emission of the light emitting unit based on the light emission instruction is present in the operation process.

9. The tag communication device according to claim 5, wherein the predetermined operation in the operation process is at least one of the following (i) and (ii),
   (i) reading information from an RFID tag for the RFID tag to which the light emission instruction has been transmitted
   (ii) writing information in an RFID tag for the RFID tag to which the light emission instruction has been transmitted.

10. The tag communication device according to claim 6, wherein the control unit performs a different operation for the RFID tag to which the light emission instruction has been transmitted in accordance with a light emission pattern of the light emission in a case in which it is determined that the light emission of the light emitting unit based on the light emission instruction is present in the operation process.

11. The tag communication device according to claim 4, wherein the predetermined operation in the operation process is at least one of the following (i) and (ii),
   (i) reading information from an RFID tag for the RFID tag to which the light emission instruction has been transmitted (ii) writing information in an RFID tag for the RFID tag to which the light emission instruction has been transmitted.

12. The tag communication device according to claim 1, wherein the control unit performs a different operation for the RFID tag to which the light emission instruction has been transmitted in accordance with a light emission pattern of the light emission in a case in which it is determined that the light emission of the light emitting unit based on the light emission instruction is present in the operation process.

13. The tag communication device according to claim 1, wherein the predetermined operation in the operation process is at least one of the following (i) and (ii),
    (i) reading information from an RFID tag for the RFID tag to which the light emission instruction has been transmitted
    (ii) writing information in an RFID tag for the RFID tag to which the light emission instruction has been transmitted.

14. The tag communication device according to claim 1, wherein, in a case in which (i) tag IDs of two or more RFID tags are acquired in the acquisition process, and (ii) it is determined that light emission of the light emitting unit based on the light emission instruction is present for one RFID tag among the two or more RFID tags in the determination process, the control unit continuously transmits the light emission instruction also to the remaining RFID tags among the two or more RFID tags in the transmission process.

15. The tag communication device according to claim 1, wherein the control unit sets a predetermined area within the imaging area of the imaging unit and determines presence/absence of light emission of the light emitting unit based on the light emission instruction within the predetermined area in the determination process.

16. The tag communication device according to claim 1, wherein the control unit performs a different operation for the RFID tag to which the light emission instruction has been transmitted in accordance with a light emission pattern of the light emission in a case in which it is determined that the light emission of the light emitting unit based on the light emission instruction is present in the operation process.

17. The tag communication device according to claim 1, wherein the predetermined operation in the operation process is at least one of the following (i) and (ii),
    (i) reading information from an RFID tag for the RFID tag to which the light emission instruction has been transmitted
    (ii) writing information in an RFID tag for the RFID tag to which the light emission instruction has been transmitted.

18. A non-transitory computer-readable recording medium, comprising a tag communication control program for causing a computer to function as the tag communication device according to claim 1, wherein the tag communication control program causes the computer to function as the control unit.

19. A method of controlling a tag communication device that includes a communication unit and an imaging unit and performs radio communication with an RFID tag comprising a light emitting unit,
    wherein the communication unit performs radio communication with the RFID tag, and the imaging unit images at least a part of a communicable range of the communication unit,
    the method comprising:
    an acquisition step of acquiring a tag identification (ID) of one or more RFID tags present in the communicable range of the communication unit through the communication unit;
    a transmission step of transmitting a light emission instruction to at least some of RFID tags corresponding to the acquired tag ID through the communication unit;
    a determination step of determining presence/absence of light emission of the light emitting unit based on the light emission instruction within an imaging area of the imaging unit on the basis of a result of imaging acquired by the imaging unit; and
    an operation step of performing a predetermined operation for an RFID tag to which the light emission instruction has been transmitted through the communication unit in a case in which it is determined that light emission of the light emitting unit based on the light emission instruction is present, wherein in a case in which light emission instructions are transmitted to two or more RFID tags in the transmission step, the light emission instructions are transmitted such that the two or more RFID tags emit light at different timings.

* * * * *